(12) United States Patent
Katoh et al.

(10) Patent No.: US 8,164,780 B2
(45) Date of Patent: Apr. 24, 2012

(54) APPROPRIATE PRINTER SELECTION SIMULATION SYSTEM, INK CONSUMPTION AMOUNT SIMULATION DEVICE, AND COST SERVER

(75) Inventors: Kazuhiko Katoh, Kanagawa (JP); Nobuhisa Nozaka, Kanagawa (JP); Kazuya Isogai, Kanagawa (JP); Rena Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/085,986

(22) Filed: Apr. 13, 2011

(65) Prior Publication Data

US 2011/0191131 A1    Aug. 4, 2011

Related U.S. Application Data

(63) Continuation of application No. 11/954,328, filed on Dec. 12, 2007, now Pat. No. 8,009,312.

(30) Foreign Application Priority Data

Dec. 27, 2006   (JP) .................................. 2006-352518

(51) Int. Cl.
*G06F 15/00*   (2006.01)
*G06F 17/00*   (2006.01)
(52) U.S. Cl. ...................................... 358/1.15; 715/234
(58) Field of Classification Search ................. 358/1.15, 358/1.9, 1.13, 474; 347/7, 19, 24, 40, 56; 399/79, 39, 301, 324, 328; 400/216.2, 196.1, 400/213; 715/234
See application file for complete search history.

(56) References Cited

U.S. PATENT DOCUMENTS

2002/0054324 A1* 5/2002 Okada et al. ................. 358/1.15
2002/0191039 A1* 12/2002 Minowa et al. .................... 347/7

FOREIGN PATENT DOCUMENTS

| JP | 2005-37918 | 2/2005 |
| JP | 2006-85487 | 3/2006 |
| JP | 2006-127465 | 5/2006 |

OTHER PUBLICATIONS

Office Action issued May 10, 2011 in Japan Application No. 2006-352518.

* cited by examiner

*Primary Examiner* — Saeid Ebrahimi Dehkordy
(74) *Attorney, Agent, or Firm* — Oblon, Spivak, McClelland, Maier & Neustadt, L.L.P.

(57) ABSTRACT

An appropriate printer selection simulation system for selecting an appropriate printer providing more expressive output with lower running cost is disclosed. The system includes a user terminal, a printer, and a server connected to each other via a network. The printer includes an e-mail generating unit extracting printer information including the ink consumption amount with respect to the printer and generating e-mail including the extracted printer information, and an e-mail transmitting unit transmitting the e-mail generated by the e-mail generating unit to the server. The server includes a cost report generating unit generating the cost report indicating that the cost of the ink consumption amount when a color copy is printed in color is less than the cost of the ink consumption amount when the color copy is printer in monochrome, and a transmitting unit transmitting the generated cost report to the user terminal.

6 Claims, 19 Drawing Sheets

FIG.3A

PRINT

PRINTER
PRINTER NAME(N): GelSprinter GX 3000 ▼  PROPERTY(P)
STATUS: IDLING
MODEL: RICOH IPSiO GX 3000
SITE: IP_133.139.164.63
COMMENT: RPCS Raster Driver (Windows 2000/XP/Server)

☑ OUTPUT TO FILE

PRINT RANGE
⦿ ALL(A)  ○ CURRENT SLIDE(E)  ○ SELECTED PART(S)
○ SUBJECT OF SLIDE SHOW(O): ▼
○ SELECT SLIDE(I):
TO DESIGNATE SLIDES USE COMMA. EX. 1,3,5-12

NO OF PRINTS
NO(C): 1

☑ PRINT EACH GROUP(T)

PRINT TARGET(W):
SLIDE ▼

DISTRIBUTION DOCUMENT
NO OF SLIDES PER PAGE(R): 6 ▼
ORDER ⦿ HORIZONTAL(Z)  ○ VERTICAL(V)

☐ GRAY SCALE(G)    ☐ FIT PAPER SIZE(F)
☐ B/W PRINT(U)     ☐ WITH FRAME TO SLIDE(M)
☐ WITH ANIMATION(D) ☐ PRINT NOT SHOWN SLIDE(H)

OK    CANCEL

FIG.3C

| Capture File:C:¥Documents and Settings¥Administorator¥My Documents¥ | | | | | | |
|---|---|---|---|---|---|---|
| File Information | | | | | | |
| Job name:action item.xls | | | | | | |
| Model:IPSiO GX3000 | | | | | | |
| Mode:Speed priority | | | | | | |
| Size/Type:A4(210 × 297mm) / Plain | | | | | | |
| Duplex:OFF | | | | | | |
| Pages:1 | | | | | | |
| Color:Mono | | | | | CMYK | |
| Result | | | | | | |
| | K | | CMY | | | |
| Ratio(%) | 212.8 | | 0 | | 212.8 | 5.32 |
| | ¢ 4.26 | | ¢ 0 | | ¢ 2 | |
| | | | | | ¢ 2 | ¢ 4.26 |

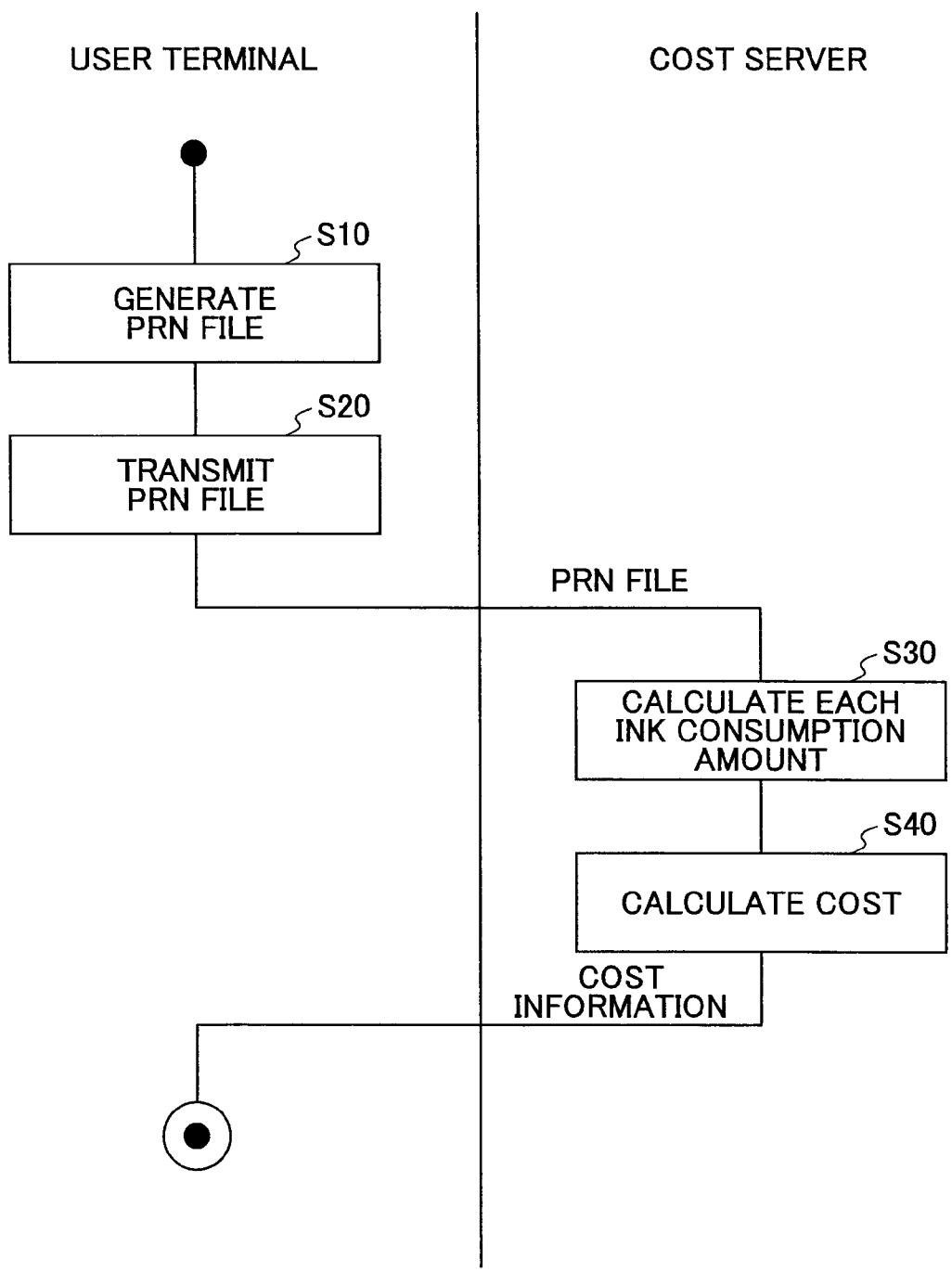

FIG.10

| INFORMATION FROM LC PRINTER | | |
|---|---|---|
| E-MAIL RECEIVING TIME | No. | 1 |
| | Date | 2006/4/1 |
| | Time | 9:30 |
| | GMT | +7 |
| MACHINE BODY UNIQUE INFORMATION | Vendor Name | GelSprinter |
| | Model Name | GX 5050N |
| | MAC Address | 00:00:74:A3:1F:01 |
| | Serial Number | J011-11020 |
| | Printer Firmware Version | 0.29 |
| | Network Adapter Firmware Version | 1.0.4 B53 04/05 |
| NO OF PRINTED PAGES | Machine Total | 1503 |
| | Black & White | 385 |
| | Level Color | 192 |
| | Full Color | 926 |
| ACCUMULATED INK CONSUMPTION AMOUNT FOR EACH COVERAGE RANGE | B/W COVERAGE | 572% |
| | LC COLOR COVERAGE | 246% |
| | FULL-COLOR COVERAGE | 3405% |
| NO OF PRINTED PAGES FOR EACH COVERAGE RANGE | 0%≦COVERAGE＜5% | 1314 |
| | 5%≦COVERAGE＜20% | 179 |
| | 20%≦COVERAGE | 10 |
| ACCUMULATED EXCHANGED INK CARTRIDGE | Black | 2 |
| | Cyan | 2 |
| | Magenta | 2 |
| | Yellow | 2 |

FIG.11A

B-Finder

Login > Customer Information Registration > Confirmation

| Customer Information | Device Information | Cost Information |

USER'S NAME:

DIVISION 1:

DIVISION 2:

ADDRESS:
Street 1:
Street 2:
City / Town
State / Province:

ZIP CODE:

AREA: Select Region

Submit   Reset

INTRANET

PAGE IS DISPLAYED

FIG.11B

B-Finder

Login > Customer Information Registration > Confirmation

| Customer Information | Device Information | Cost Information |

| # | Model Name | Serial Number |
|---|---|---|
| 1 | GX3000 | R07 ▼ 12345678 |

Machine Information

| PURCHASE DATE | Jan ▼ 1 2006 ▼ |
| ACCOUNT GROUP | |
| ACCESSORIES | ☐ Network Interface Card<br>☐ Paper Feed Unit<br>☐ Multi Bypass Tray |
| STANDARD PRINTER | ○ Yes ○ No |
| NO OF SHARING USERS | 1 ▼ people |
| INSTALLATION | ○ Replacement<br>○ New Installation |
| CONNECTION | ○ USB ○ LAN |

Add Other

Submit   Reset

INTRANET

PAGE IS DISPLAYED

FIG.12A

| | Customer profile & installation details | |
|---|---|---|
| Customer | USER NAME | Ricoh Company Ltd |
| | TYPE OF BUSINESS | Manufacturing |
| | TYPE OF OPERATION | Service |
| Machine | MODEL NAME | GX5050N |
| | SERIAL NUMBER | R0900099998 |
| | INSTILLATION DATE | 1st April, 2007 |
| | COST REPORT ISSUING DATE | 29 September, 2007 |
| | ACCUMULATED NO OF PRINTINGS | 3,500 prints |
| | B / W | 2000% |
| | LC COLOR | 1000% |
| | FULL-COLOR | 500% |
| | ACCUMULATED INK CONSUMPTION AMOUNT | 13883% |
| | COST PER SHEET | B / W  0.2$ |
| | | LC COLOR  0.1$ |
| | | FULL-COLOR  0.4$ |
| | RATE OF COST REDUCTION | 10% |

APPROPRIATE PRINTER SELECTION SIMULATION SYSTEM, INK CONSUMPTION AMOUNT SIMULATION DEVICE, AND COST SERVER

CROSS-REFERENCE TO RELATED APPLICATIONS

This application is a continuation of and claims the benefit of priority from U.S. Ser. No. 11/954,328, filed Dec. 12, 2007, now U.S. Pat. No. 8,009,312 which claims the benefit of priority from Japanese Patent Application No. 2006-352518, filed Dec. 27, 2006, the entire contents of each of which are incorporated herein by reference.

BACKGROUND OF THE INVENTION

1. Field of the Invention

The present invention relates to a simulation system, an ink consumption amount simulation device, and a cost server used for supporting the selection of an appropriate printer based on running costs.

2. Description of the Related Art

In offices, a large amount of documents have been copied and printed on a daily basis. Because of this situation, there is a demand for reducing the running cost including ink/toner consumption costs, a cost charged based on the number of printed sheets, and a unit cost. To that end, there have been proposed some techniques to reduce the running cost based on the number of copied sheets and the consumed amount of consumables such as ink and toner (see, for example, Cited Document 1). The Cited Document 1 suggests that a printer administrator select an appropriate printer consuming less toner in a recommended printing setting as a reference setting and the printing charge be determined based on a printing setting by a user who refers the recommended printing setting. As a result, it is suggested to the user to select the recommended printing setting in an attempt to reduce the running cost. Cited Document 1: Japanese Patent Application Publication No. 2005-037918.

As described in the cited document 1, it may be desirable to reduce the running costs of ink and toner as far as the daily amount of printing is concerned. However, there may be another case where a user requires an expressive output of printing depending on, for example, the content of documents and the purpose of use. In actual operations, a user selects monochrome or color and also the ink injection amount when printing.

However, there is a remaining problem that the user can hardly check whether the setting by the user's own choice is really good for reducing the running cost. As a result, a setting made by a user for reducing the running cost may possibly lead to an increase of the running cost, contrary to the will of the user.

Further, and similarly, it may be difficult to select an appropriate printer capable of reducing the running cost or having excellent characteristics in balance between the running cost and expressive output to meet the content of documents that the user prints in many cases and the user's purpose of use.

SUMMARY OF THE INVENTION

The present invention is made to solve the problems and may provide an appropriate printer selection simulation system, an ink consumption amount simulation device, and a cost server used for supporting the selection of an appropriate printer by considering the balance between the running cost and desired expressive output.

According to one aspect of the present invention, there is provided an appropriate printer selection simulation system including a user terminal, a printer, connected to the user terminal via a network, translating a print file transmitted from the user terminal via the network and printing the translated print file, and a server, connected to the user terminal and the printer via the network, generating a cost report with respect to the printer and transmitting the generated cost report to the user terminal, wherein the printer includes an e-mail generating unit extracting printer information including an ink consumption amount with respect to the printer and generating e-mail including the extracted printer information, and an e-mail transmitting unit transmitting the e-mail generated by the e-mail generating unit to the server, wherein the server includes a cost report generating unit generating the cost report based on the ink consumption amount, the cost report indicating that the cost of the ink consumption amount when a color copy is printed in color is less than the cost of the ink consumption amount when the color copy is printed in monochrome, and a transmitting unit transmitting the generated cost report to the user terminal.

According to the aspect of the present invention, the ink consumption amount when a color copy is actually printed in color is transmitted to the server by e-mail and the server generates the cost report indicating that the cost of the ink consumption amount is reduced by changing from the monochrome printing to the color printing. As a result, a user may understand that the ink consumption amount and cost can be reduced when a color copy is printed in color rather than printed in monochrome.

According another aspect of the present invention, the ink consumption amount when a color copy is printed in monochrome is a toner consumption amount of a laser printer estimated from the ink consumption amount of the printer and the ink consumption amount when a color copy is printed in color is the ink consumption amount of the printer.

According to the aspect of the present invention, it is recognized that the cost when a color copy is printed in color using the printer is less than the cost when the color copy is printed in monochrome using a laser printer. Therefore, when the printer is selected rather than the laser printer, more expressive output with lower running cost may be realized.

According to still another aspect of the present invention, the ink consumption amount when a color copy is printed in monochrome is the ink consumption amount of the printer estimated from the ink consumption amount when color printing is performed by the printer, and the ink consumption amount when a color copy is printed in color is the ink consumption amount of the printer; or the ink consumption amount when a color copy is printed in monochrome is the ink consumption amount of the printer when monochrome printing is performed by the printer, and the ink consumption amount when a color copy is printed in color is the ink consumption amount of the printer estimated from the ink consumption amount when monochrome printing is performed by the printer.

According to the aspect of the present invention, it is recognized that the cost when a color copy is printed in color using the printer is less than the cost when the color copy is printed in monochrome using the printer. Therefore, after the printer is purchased, it is possible to check whether a preferable printing method is selected, and select the preferable printing method to reduce the running cost with preferable printing output.

According to still another aspect of the present invention, the cost report includes the number of printed pages or ink consumption amount of both color and monochrome printings in a prescribed period.

According to the aspect of the present invention, the number of printed pages or ink consumption amount of both color and monochrome printings may be recognized to take measures to, for example, eliminate waste.

According to still another aspect of the present invention, the cost report includes the number of printed pages where printing cost of the pages is reduced by changing from monochrome printing to color printing when a color copy is printed or a ratio of the number of printed pages where printing cost of the pages is reduced to the number of total printed pages.

According to the aspect of the present invention, since the number of printed pages where the printing cost is reduced by changing from the monochrome printing to the color printing is obtained, the effect of color printing may be better recognized with the obtained number.

According to still another aspect of the present invention, the server transmits a web page to the user terminal, the web page being arranged to be able to receive the input of user information, the user terminal displays the web page transmitted from the server on a display of the user terminal and transmits the user information to the server after the user information is entered through the web page; the server receives the user information, associates the ink consumption amount, included in the e-mail from the printer, with the received user information, stores the associated ink consumption amount and user information, and generates the cost report with respect to the user.

According to the aspect of the present invention, the printer information is associated with the user information and the associated information is stored. As a result, the printer information may be analyzed using the user information.

According to still another aspect of the present invention, the server further comprises a sales supporting unit calculating profit earned by selecting and using the printer based on the ink consumption amount and trend of the profits and predicting future profits based on the calculated trend of the profits.

According to the aspect of the present invention, it may be possible to know when the profitability from the sale of the printer is made earlier by predicting the future profit from the profits based on the ink consumption amount.

According to still another aspect of the present invention, the printer information includes information on whether the printer is purchased with trade-in and or without trade-in, and the sales supporting unit sums up both the ink consumption amount with respect to plural printers, each of the printers being connected to the network and purchased with trade-in and the ink consumption amount with respect to plural printers, each of the printers being connected to the network and purchased without trade-in based on the printer information transmitted from the printer.

According to the aspect of the present invention, since the information of the ink consumption amount when the printer is sold with trade-in and without trade-in can be obtained, the selling company selling the printer may calculate the future ink consumption amount based on the obtained information.

According to still another aspect of the present invention, the printer information includes information whether the printer has an additional tray or not, and the sales supporting unit calculates both the ink consumption amount with respect to plural printers, each of the printers being connected to the network and having an additional tray and the ink consumption amount with respect to plural printers, each of the printers being connected to the network and having no additional trays based on the printer information transmitted from the printer.

According to the aspect of the present invention, since the selling company may know the ink consumption amount of the printers with an additional tray and the printers without additional trays, the selling company may determine whether the additional tray is included when selling the printer.

According to still another aspect of the present invention, there is provided an appropriate printer selection simulation system including a user terminal, a printer connected to the user terminal via a network, and a server connected to the user terminal and the printer via the network, wherein the user terminal includes a print file generating unit generating a first print file used when a color copy is printed in color and a second print file used when the color copy is printed in monochrome, the first and the second print files being translated and printed by the printer, a print file transmitting unit transmitting the generated first and second print files to the server, wherein the server includes a simulating unit calculating a first ink consumption amount when the transmitted first print file is printed on a sheet and a second ink consumption amount when the transmitted second print file is printed on a sheet, and a cost information transmitting unit transmitting the first ink consumption amount and the second ink consumption amount that is less than the first ink consumption amount to the user terminal.

According to the aspect of the present invention, the user may recognize that the ink consumption amount and the cost when a color copy is printed in color is less than the ink consumption amount and the cost, respectively, when the color copy is printed in monochrome. Therefore the user may select a preferable printer and printing setting that provides a more expressive output with lower running cost.

According to an embodiments of the present invention, there are provided an appropriate printer selection simulation system, an ink consumption amount simulation device, a cost server, an ink consumption amount simulation program, and a report generating program that may enable a user to select an appropriate printer in view of the balance between the running cost and the requirement of expressive output.

BRIEF DESCRIPTION OF THE DRAWINGS

FIG. 7 is an activity diagram showing a process of calculating a printing cost performed by the appropriate printer selection simulation system according to one embodiment of the present invention;

FIG. 10 is a drawing showing exemplary user information transmitted by e-mail according to one embodiment of the present invention;

FIGS. 11A and 11B are drawings showing exemplary setting menus of the user information according to one embodiment of the present invention;

FIGS. 12A, 12B, and 12C are drawings showing exemplary contents of a cost report according to one embodiment of the present invention;

DETAILED DESCRIPTION OF THE PREFERRED EMBODIMENTS

Figure 1A:
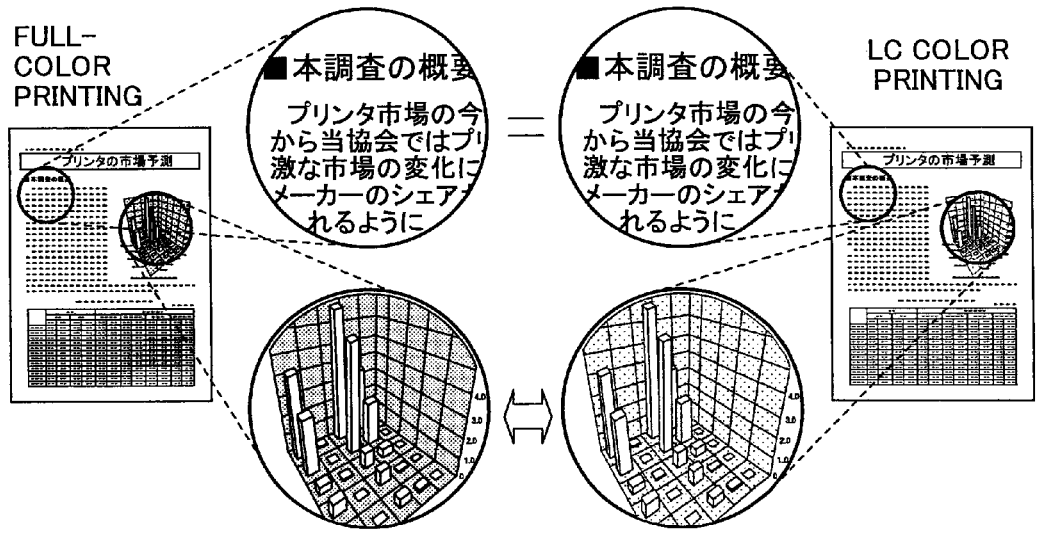
FIG. 1A is a drawing showing a comparison of output results between when a color copy is full-color printed and when the color copy is LC processed and printed.

In the following, exemplary embodiments of the present invention are described with reference to the accompanying drawings.

According to one embodiment of the present invention, there is provided an appropriate printer selection simulation system 10 that calculates the costs when a color copy is printed in both color and monochrome and allows a user to select a lower-cost printing mode and/or to select an appropriate printer before the user starts printing. When both the cost of printing in color and the cost of printing in monochrome are determined before printing, and the cost of color printing is equivalent to or less than the cost of monochrome printing, a user may select color printing of a color copy without worrying about the cost of printing. On the other hand, when the cost of color printing is higher than the cost of monochrome printing, the user may select color printing or monochrome printing depending on, for example, the content of the document to be printed.

Further, an appropriate printer selection simulation system 10 calculates the cost of color or monochrome printing based on the actual amount of ink consumed by color or monochrome printing, respectively. This calculated result may facilitate selecting an appropriate printing mode, color printing or monochrome printing, and an appropriate product to be purchased.

In an appropriate printer selection simulation system 10 according to an embodiment of the present invention, since the cost of the ink consumption amount based on the ink consumption amount before printing or the cost of the ink consumption amount based on the actual ink consumption amount of printing is calculated, a user can select either color printing or monochrome printing based on the balance between the running cost and desired expressive quality of the contents to be printed. A user can also select an appropriate printer having excellent characteristics in balance between the running cost and expressive output that meets the user's business or purpose.

Further, according to an embodiment of the present invention, there is provided a server that receives the printer information transmitted from a printer via e-mail, calculates the cost based on the transmitted printer information, and reports the calculated cost to a user terminal. Because of this feature, the user can understand, for example, the number of printed pages and the amount of ink consumption of the printer so as to take appropriate measures such as cutting the waste of printing. Also, a selling company may predict a future profit of a printer based on the printer information of the printer and may make use of the printer information for future sales.

Though, in the following, explanations based on an inkjet printer are described as an example for explaining embodiments of the present invention, it should be noted that the appropriate printer selection simulation system 10 according to the embodiments of the present invention may also be applied to, for example, a multifunctional product apparatus including a facsimile machine, a copy machine, and a scanner.

[Color Management]

First, a color management process (hereinafter simply referred to as "LC processing") provided in a printer according to an embodiment of the present invention is described (hereinafter, color printing that has been performed with the LC processing is simply referred to as "LC color printing"). Generally, it is believed that the cost of color printing is higher than that of monochrome printing. For example, when CMYK inks are used to express subtractive secondary colors R,G,B, since the colors R,G,B are the subtractive mixtures of M and Y, C and Y, and C and M, respectively, additional inks are required for printing such subtractive secondary colors compared with the case of monochrome printing. To reduce the ink consumption amount, according to an embodiment of the present invention, there is provided a printer requiring less ink consumption amount in color printing so that the cost of the color printing is equivalent to or less than that of monochrome printing.

FIG. 1A is a diagram showing a comparison of printed results between when a color copy is printed in full-color and when the color copy is subjected to the LC processing and printed. Though the drawing is monochrome, the original drawing of both printed results is printed in color. When comparing the full-color printing and the LC color printing, both are similarly clear in character regions. However, the color of the graph region of the LC color printing on the right-hand side is lighter than that of full-color printing.

The printer according to an embodiment of the present invention (hereinafter referred to as a "LC printer 4") divides an image to be printed into a character region and a graphical region where a picture, a graph, or an illustration is provided. In the PC printer 4, substantially the same amount of ink as that in full-color printing (or monochrome printing) is used in the character region, but in the graphic region, a certain coefficient is multiplied by each image gradation data set to reduce the ink consumption amount. Because of this feature, it becomes possible to reduce the ink consumption amount used in the region of subtractive secondary and tertiary colors that otherwise requires a greater ink consumption amount. Also, the character region requiring high visibility can be printed clearly. Therefore, color printing is performed without degrading the quality of printing. In other words, color printing is performed while the cost is reduced and expressive output is achieved at the same time.

Figure 1B:
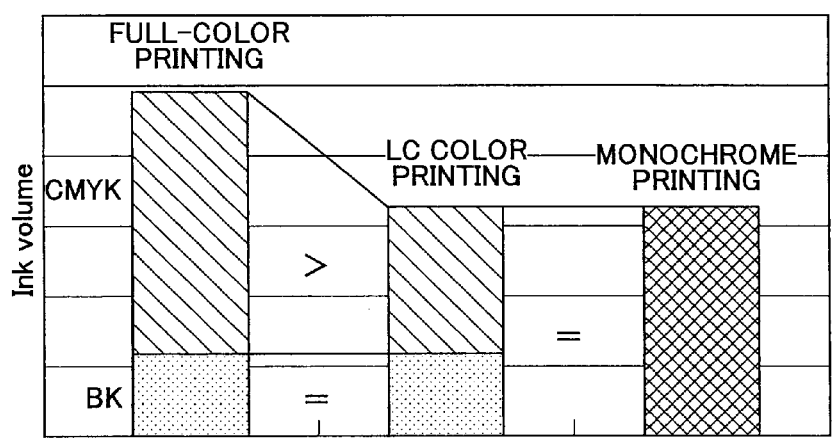
FIG. 1B is a graph comparing the ink consumption amount among the cases of the full-color printing, the LC color printing, and the monochrome printing.

FIG. 1B is a drawing showing a comparison of the ink consumption amounts in full-color, LC color, and monochrome printings. The ink consumption amounts in FIG. 1B are calculated using a standard color copy of J6 sheet provided by Japanese Electronic Industry Development Association (JEIDA). As shown in FIG. 1B, the amounts of Bk ink consumption in full-color printing and in LC color printing are in the same range, but the amount of CMY inks consumption in LC color printing is just almost half of that in full-color printing. As a result, the ink consumption amount in LC color printing is in the same range of that in monochrome printing. Since the unit costs of Bk ink and any of CMY inks are in the same range, when the LC printer 4 according to an embodiment of the present invention is used, color printing can be performed with equivalent cost or less cost than that of monochrome printing.

[Printing Simulation]

In the LC printer 4, since each of the CMYK inks is separately controlled, when a color copy is printed in color, each consumption amount of the CMYK inks is known. Therefore, by multiplying each known amount by the corresponding unit price, the cost in color printing and monochrome printing can be calculated. However, if the cost of the LC color printing, the color printing, or the monochrome printing cannot be calculated without actual printing, it may be hard to decide which method to use because the costs of different printings cannot be compared before actual printing. To solve this problem, the LC printer 4 according to an embodiment of the present invention is provided so as to calculate the cost of the LC color printing or the monochrome printing by simulating the amount of ink consumption before a color copy is actually printed in color. This printing simulation is performed in a PRN file generating unit and a simulating unit that execute a program in, for example, a computer.

Figure 2:
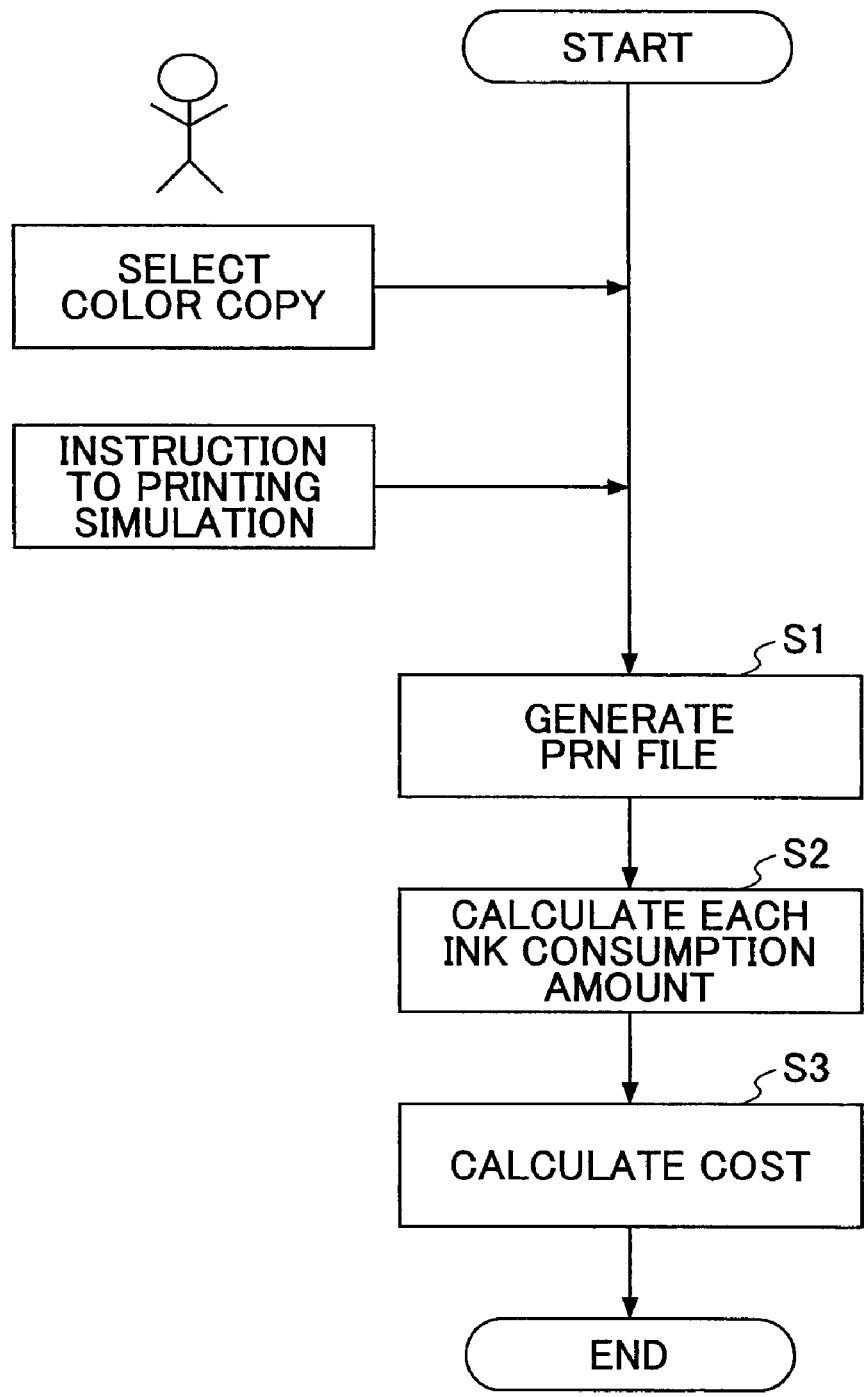
FIG. 2 is a flowchart showing an exemplary process of printing simulation according to an embodiment of the present invention.

FIG. 2 is a flowchart showing a process of the printing simulation. To begin with, a user operates a computer to select a color copy to be printed to simulate the cost of printing the color copy and starts the printing simulation.

FIG. 3A shows an exemplary setting menu of the printing simulation. In a menu as shown in FIG. 3A, a user selects the LC printer 4 to perform the LC color printing or the monochrome printing and marks the checkbox of "output to a file". Then, when the "OK" button is clicked, the PRN file generating unit generates a PRN file (a print image file). An application program that has generated the color copy transmits the image data of the color copy along with a command to a GDI (Graphic Device Interface) provided by, for example, the OS. Then, a printer driver receives the color copy via the GDI and generates a PRN file from the received color copy (step S1 in FIG. 2).

Next, the simulating unit calculates each consumption amount of CMYK inks based on the generated PRN file (step S2). It should be noted that only one PRN file of either the LC color printing or the monochrome printing may be selected and generated, but, preferably, PRN files of both the LC color printing and the monochrome printing are generated for comparison purposes.

Figure 3B:
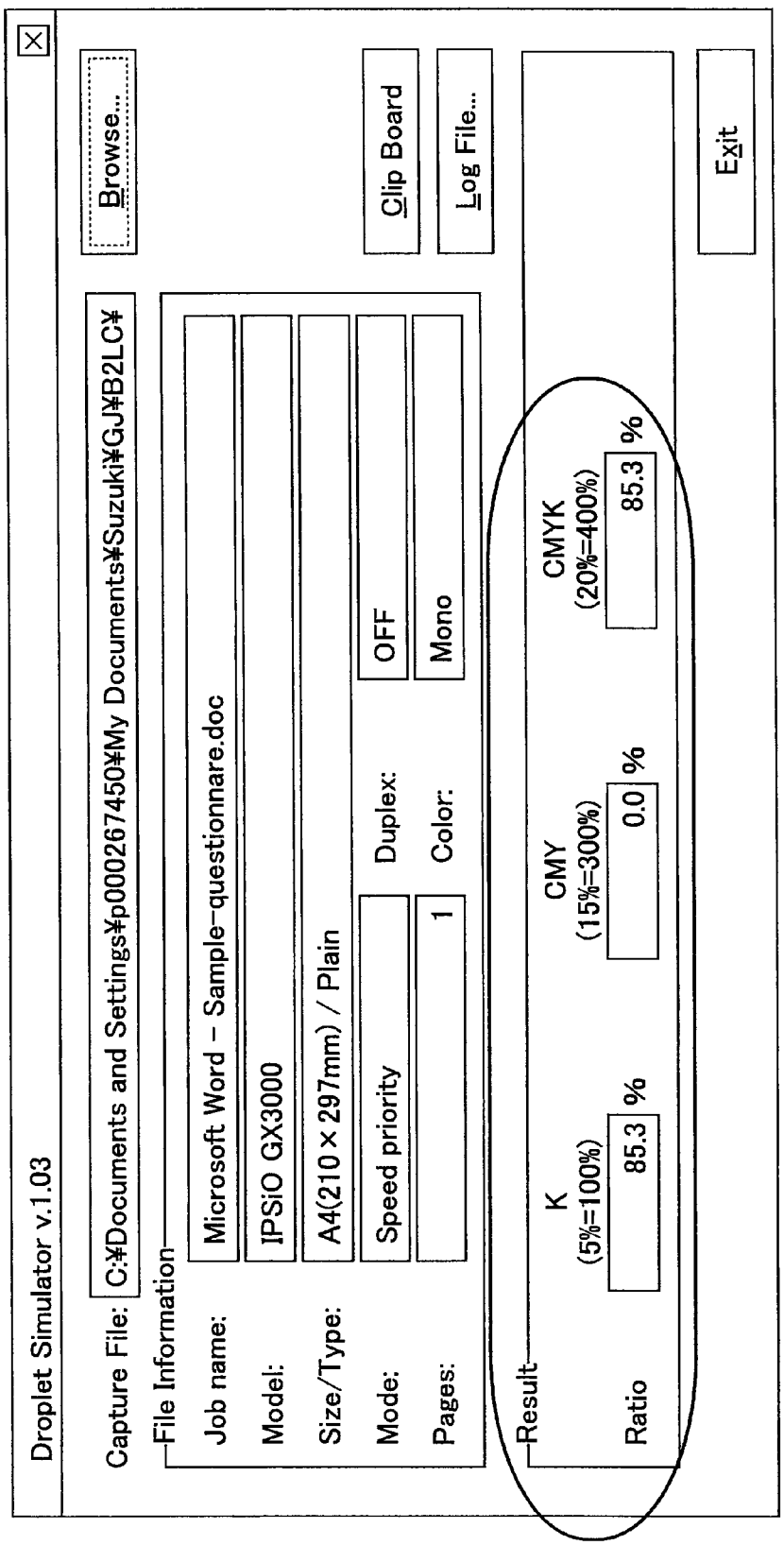
FIG. 3 is a drawing showing an exemplary setting menu of the printing simulation.

FIG. 3B shows an example menu showing the calculated consumption amount of each ink when the monochrome printing is selected. In this example as shown in FIG. 3B, the data of Bk ink is 85.3% and the data of CMY ink is 0% because the monochrome printing is selected.

Regarding the percent (%) display in FIG. 3B, data 100% is displayed when an ink is applied on five percent of a printed sheet surface (hereinafter may be referred to as "coverage").

In the same manner, since the CMY is three-color ink, data 300% is displayed when the ink is applied on 15% of the printed sheet surface. Also, since the CMYK is four-color ink, data 400% is displayed when the ink is applied on 20% of the printed sheet surface. By displaying like this, it becomes possible to compare the consumption of each ink simply by totaling each ink consumption amount.

Next, the simulating unit calculates the cost based on the ink consumption amount (step S3). FIG. 3C shows example data of the calculated cost. The simulating unit can calculate the cost as shown in FIG. 3C based on a prescribed calculation method. In the example of FIG. 3C, since 2 cents is charged when the coverage is 5% and the ink consumption amount is 212.8%, the amount 2 cents X 2.128=4.26 cents is the cost of printing one copy.

In this manner, the simulating unit can calculate the cost of each color ink without any actual printing. Though the operation of each step is separately described in FIG. 2, a series of processes from generating a PRN file up to calculating the cost may be preformed as a whole after a file of the color copy to be printed is selected and a predetermined operation is performed.

Further, a computer or the LC printer 4 including the simulating unit can simulate the costs of the monochrome printing and the LC color printing before the actual printing and, for example, automatically select the LC color printing when the cost of the LC color printing is equal to or less than that of the monochrome printing or, otherwise, select the monochrome printing, thereby obtaining an expressive output and reducing the running cost at the same time.

[Web Site]

According to an embodiment of the present invention, there is provided a web site describing the structure of the LC processing and the structure of the LC printer 4 to provide a user who is interested in reducing printing costs with the information of, for example, the LC printer 4 from the web site.

Figure 4A:
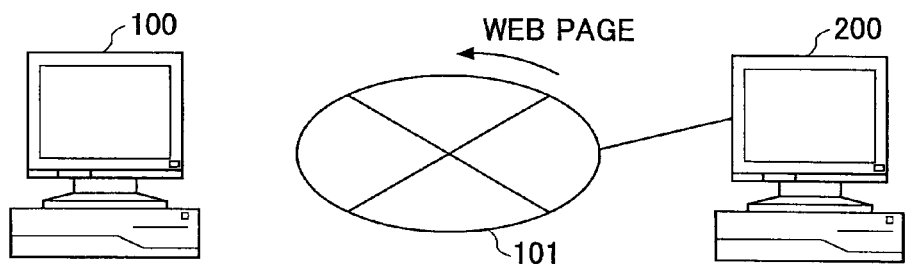
FIG. 4A is a drawing illustrating a connection between a Web server and a client terminal according to one embodiment of the present invention.
Figure 4B:
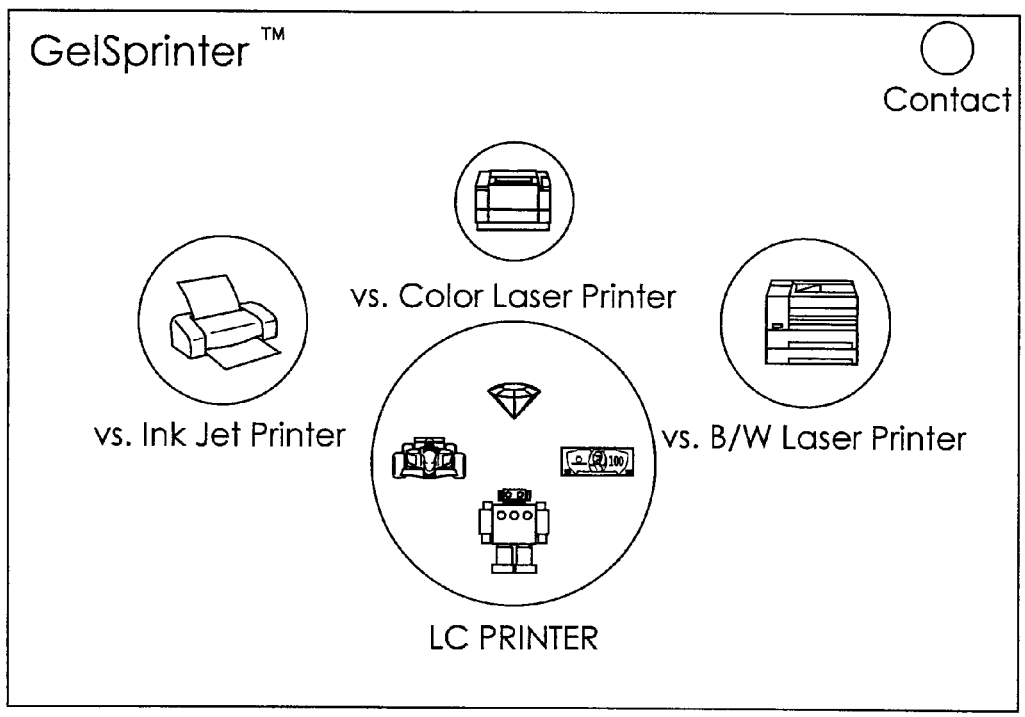
FIG. 4B is a drawing showing an exemplary menu of a web site that is provided by the Web server and displayed on the client terminal.

FIGS. 4A and 4B are drawings illustrating a web site describing the LC printer 4. In FIG. 4A, a client terminal 100 is connected to a Web server 200 via a network 101. A user may search using a search site or type the URL of the web site to access the web page (homepage) of the web site provided by the Web server 200.

FIG. 4B shows an exemplary menu of the web page displayed on a display device of the client terminal 100. As shown in FIG. 4B, the web page provides a description of not only the LC printer 4 but also, for example, the comparison data with a inkjet printer, a color laser printer, and a monochrome printer. From the descriptions, a user who is using, for example, a monochrome printer can compare between the LC printer 4 and the printer currently being used and understand the technique employed in the LC printer 4, the reason why the LC printer 4 can print fast, the print quality, and the reason why the cost of LC printing is low.

[Appropriate Printer Selection Simulation System A]

Next, the appropriate printer selection simulation system 10 including the LC printer 4 and the simulating unit is described. In the following, a case is described in which a user without the LC printer 4 capable of performing the LC color printing calculates the cost of color printing.

The user understands the advantages of the LC printer 4 due to visiting the web site, but may well wish to know whether the cost of color printing will actually be low as described in the web site before purchasing. To that end, the appropriate printer selection simulation system 10 provides a system capable of calculating the cost based on a PRN file and reporting the calculated cost to the user.

Figure 5:
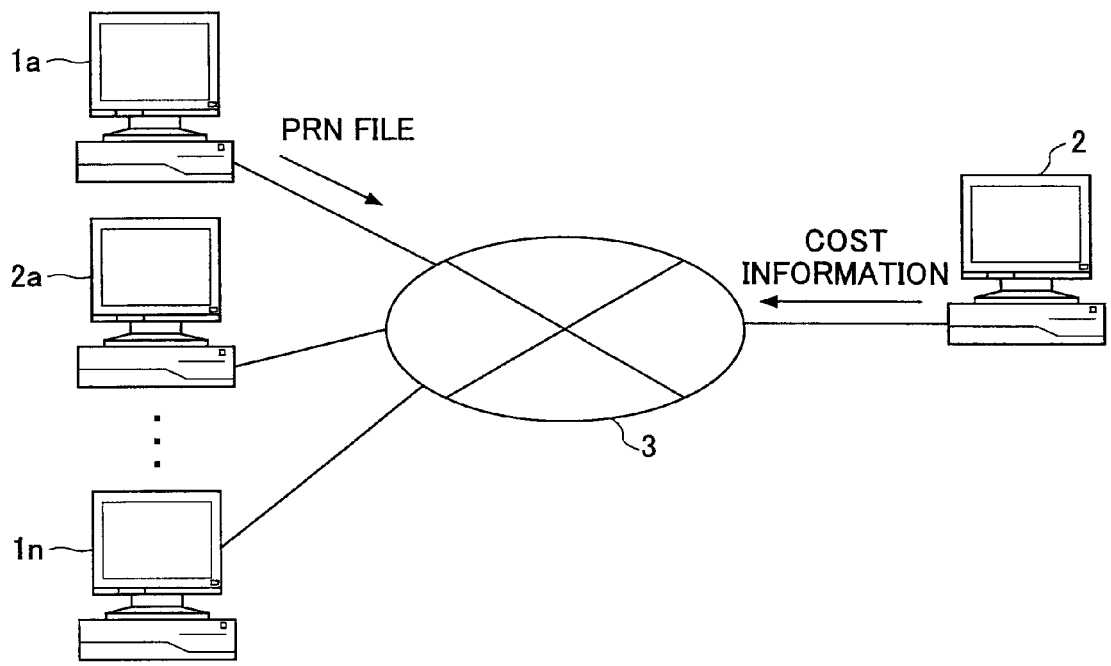
FIG. 5 is a drawing showing an exemplary configuration of an appropriated printer selection simulation system according to one embodiment of the present invention.

FIG. 5 shows an exemplary configuration of the appropriate printer selection simulation system 10. As shown in FIG. 5, there are provided user terminals 1a through 1n (hereinafter simply referred to as "a user terminal 1") and a cost server 2 connected to each other via a network 3. The network 3 may be, for example, the Internet or an office LAN. In the configuration, a data link between the user terminal 1 and the cost server 2 is established using the Point to Point Protocol (PPP). Then, the user terminal 1 and the cost server 2 can transmit and receive data using the Hyper Text Transfer Protocol (HTTP) or the File Transfer Protocol (FTP) which are for the upper layers of the Transmission Control Protocol/Internet Protocol (TCP/IP) and can transmit e-mail using, for example, the Simple mail Transfer Protocol (SMTP) or the Multipurpose Internet Mail Extension (MIME). It should be noted that it doesn't matter whether wire or wireless communication devices are used.

Figure 6A:
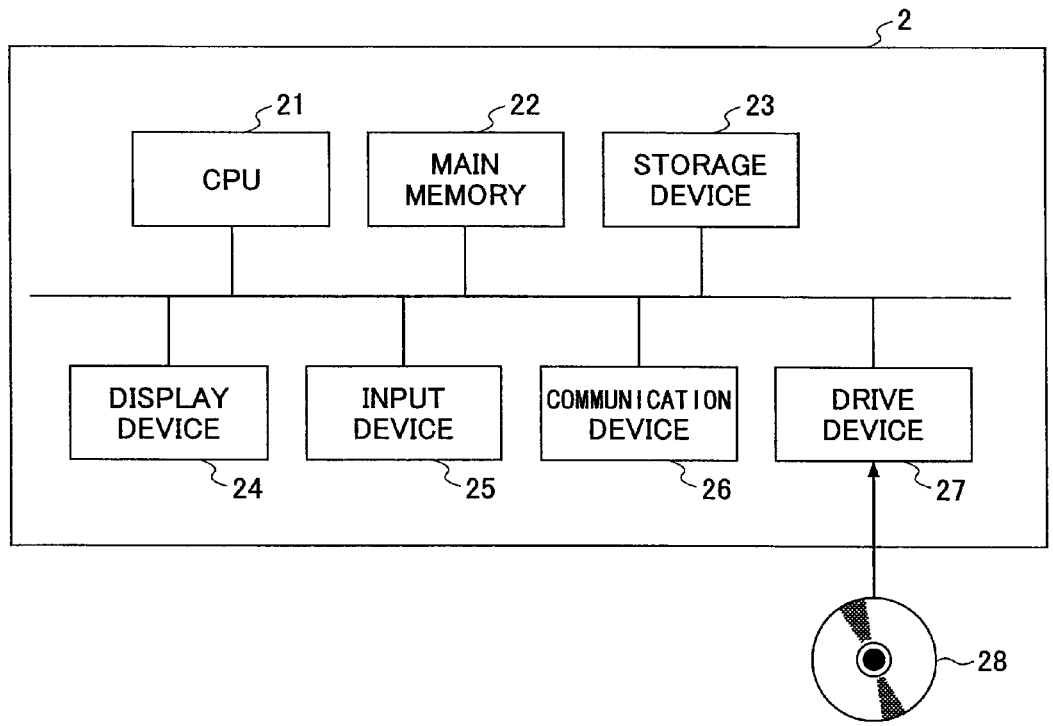
FIG. 6A is a drawing showing an exemplary configuration of a cost server according to one embodiment of the present invention.

FIG. 6A is a diagram showing an exemplary hardware configuration of the cost server 2. Since the configuration of the user terminal 1 is substantially the same as that of the cost server 2, the figure of the user terminal 1 is omitted herein. As shown in FIG. 6A, the cost sever 2 includes a CPU 21, a main memory 22, a storage device 23, a display device 24, an input device 25, a communication device 26, and a drive device 27, connected to each other via a bus.

The CPU 21 provides various functions by loading programs such as an OS and an application from the storage device 23 and executing the loaded programs. The CPU 21 integrally controls the processes performed by the cost server 2. The main memory 22 is constituted of Random Access Memory (RAM) and is used as a working memory where the OS, programs, and data are temporarily stored. The storage device 23 is a non-volatile memory such as a Hard Disk Drive (HDD) and a flash memory and stores the OS, programs, and a file such a driver. The display device 24 displays data on a display such as a Liquid Crystal Display (LCD) according to, for example, the resolution and the number of colors of the displayed image information specified by the program. On the display device 24, for example, a Graphical User Interface (GUI) forms an image and various windows and data that are necessary for the operations are displayed.

The input device 25 is constituted of, for example, a keyboard and a mouse and is used to input various operational directions from a user. The drive device 27 is configured so that a recording medium 28 can be inserted into the drive device 27, it reproduces the information recorded in the recording medium 28, and transmits the reproduced information to, for example, the main memory 22. The drive device 27 is used when a program and data are recorded on the recording medium 28. The communication device 26 is an interface to connect to the network 3 such as the Internet and a LAN and is constituted of, for example, a modem and a Network Interface Card (NIC).

Figure 6B:
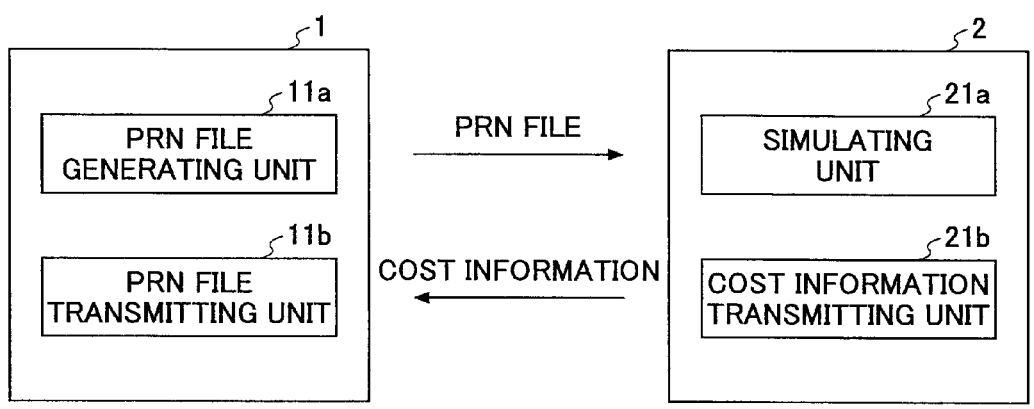
FIG. 6B is an exemplary functional block diagram of a user terminal and the cost server according to one embodiment of the present invention.

FIG. 6B is a drawing showing exemplary functional blocks of the user terminal 1 and the cost server 2. As shown in FIG. 6B, the user terminal 1 includes a PRN file generating unit 11a generating a PRN file and a PRN file transmitting unit 11b transmitting the generated PRN file to the cost server 2. The cost server 2 includes a simulating unit 21a calculating the ink consumption amount and the cost from the PRN file and a cost information transmitting unit 21b transmitting the cost information including the calculated ink consumption amount and the cost to the user terminal 1. The PRN file generating unit 11a may alternatively be implemented in a printer driver. Each of the above units is realized when the CPU of the user terminal 1 or the cost server 2 executes the relevant program. The relevant program (ink consumption amount simulation program used for the ink consumption amount simulation device described in claims of the present invention) may be stored in the recording medium 28 for distribution and may be downloaded from, for example, the Web server 200 through the network 3.

FIG. 7 is an exemplary activity diagram showing a process of calculating the printing cost performed by the appropriate printer selection simulation system 10. A user previously downloads and acquires the PRN file generating unit 11a from, for example, the Web server 200. When more than one color copy is selectable, the user selects one color copy to calculate the printing cost of the color copy.

The PRN file generating unit 11a generates a PRN file of the selected color copy (step S10 in FIG. 7). The PRN file transmitting unit 11b transmits the generated PRN file to the cost server 2 (step S20). In this case, it should be noted that two PRN files one for each the monochrome printing and the LC color printing are separately generated. Further, as a method of transmission, after connecting to the IP address (URL) of the cost server 2, the PRN files may be transmitted using the FTP or e-mail with the PRN files attached to the e-mail.

When the cost server 2 receives the PRN files, the simulating unit 21a calculates the consumption amount of each ink (step S30) and the cost (step S40). Then the cost information transmitting unit 21b transmits the cost information (calculated ink consumption amount and cost) to the user terminal 1. In this case as well, the cost information may be transmitted using the FTP to the user terminal 1 currently connected or e-mail with the cost information attached to the e-mail.

By performing the above processes, the user can acquire the cost information of the monochrome printing and the LC color printing as shown in FIG. 3C. As a result, the user may know that the cost of the LC color printing is equal to or less than that of monochrome printing.

Further, if users know that the cost of the LC color printing is equal to or less than that of monochrome printing, most of the users prefer color printing due to its higher expressiveness. As a result, the users may not continue the past common practice of selecting monochrome printing using a monochrome laser printer in view of the cost based on past information. Namely the appropriate printer selection simulation system 100 according to an embodiment of the present invention may give an incentive to the users to purchase the LC printer 4.

In FIG. 6B, though the cost server 2 includes the simulating unit 21a, a program realizing the simulating unit 21a may be provided so as to be downloadable from, for example, the Web server 200. The user may download the program into the user terminal 1 and compare the costs of the LC color printing and the monochrome printing in the user terminal 1.

[Appropriate Printer Selection Simulation System B]

In addition to the above case where a user purchases a product after ascertaining the validity of the LC printer 4 based on the simulation result without using an actual LC printer 4 of the appropriate selection simulation system 10, some users may further wish to ascertain that the cost is effectively reduced by actually using the LC printer 4. To that end, in the following, a case is described in which a user uses the LC printer 4 installed at the user site and a demonstration of the appropriate printer selection simulation system 10 is performed.

Figure 8:
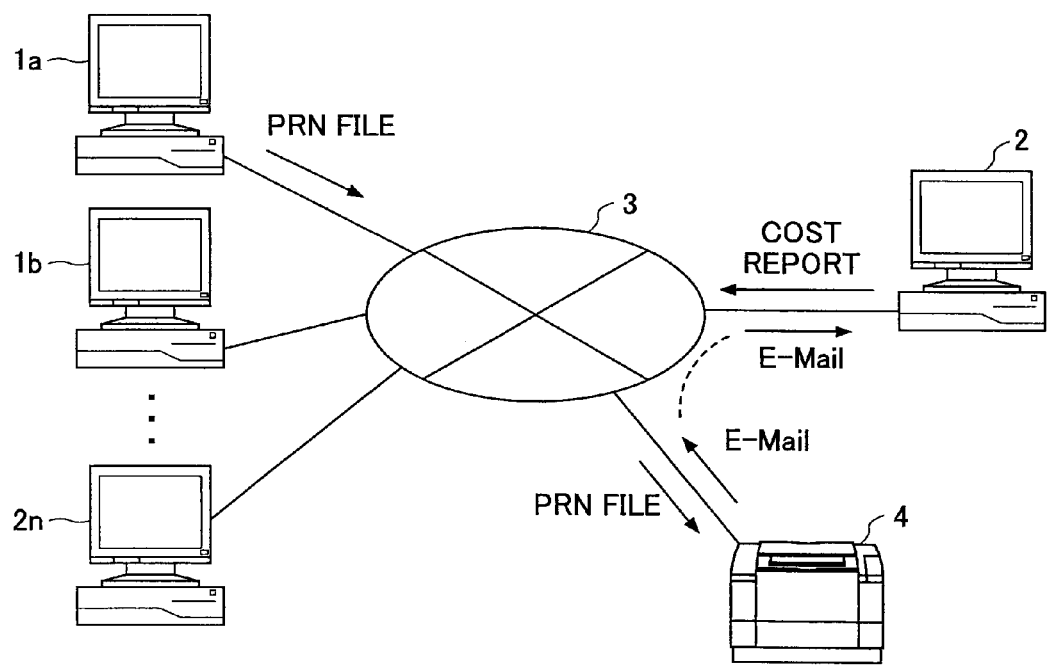
FIG. 8 is a drawing showing another exemplary configuration of an appropriate printer selection simulation system according to one embodiment of the present invention.

FIG. 8 shows an exemplary configuration of the appropriate printer selection simulation system 10. The same reference numerals used in FIG. 5 are also used in FIG. 8 for the same or similar elements and descriptions of the elements are herein omitted. As shown in FIG. 8, the LC printer 4 is connected to a network 3. The LC printer 4 may be provided by a selling company for demonstration purposes. Further, the Web server 200 and the cost server 2 are also provided by the selling company.

A user can operate any one of the user terminals 1a through 1n to designate the IP address of any one of plural (only one shown) LC printers 4 to perform the LC color printing. When a user operates the terminal 1 to print a desired color copy, the PRN file generating unit 11a generates a PRN file and the generated PRN file is transmitted to the LC printer 4. As is the case with other printing such as the full-color printing, the LC printer 4 translates the PRN file and then performs the LC color printing.

The LC printer 4 has a function of accumulating the printer information including the number of printed pages and transmitting the accumulated printer information to the cost server 2 by e-mail. By using this function, the LC printer 4 periodically (for example, monthly) transmits the accumulated printer information to the server 2. Because of this feature of the appropriate printer selection simulation system 10, the selling company can grasp the use status of the LC printer 4 that is provided to the user for demonstration purposes and the user also can recognize the fact that, for example, the cost of the LC color printing is less than that of the monochrome printing.

Figure 9:
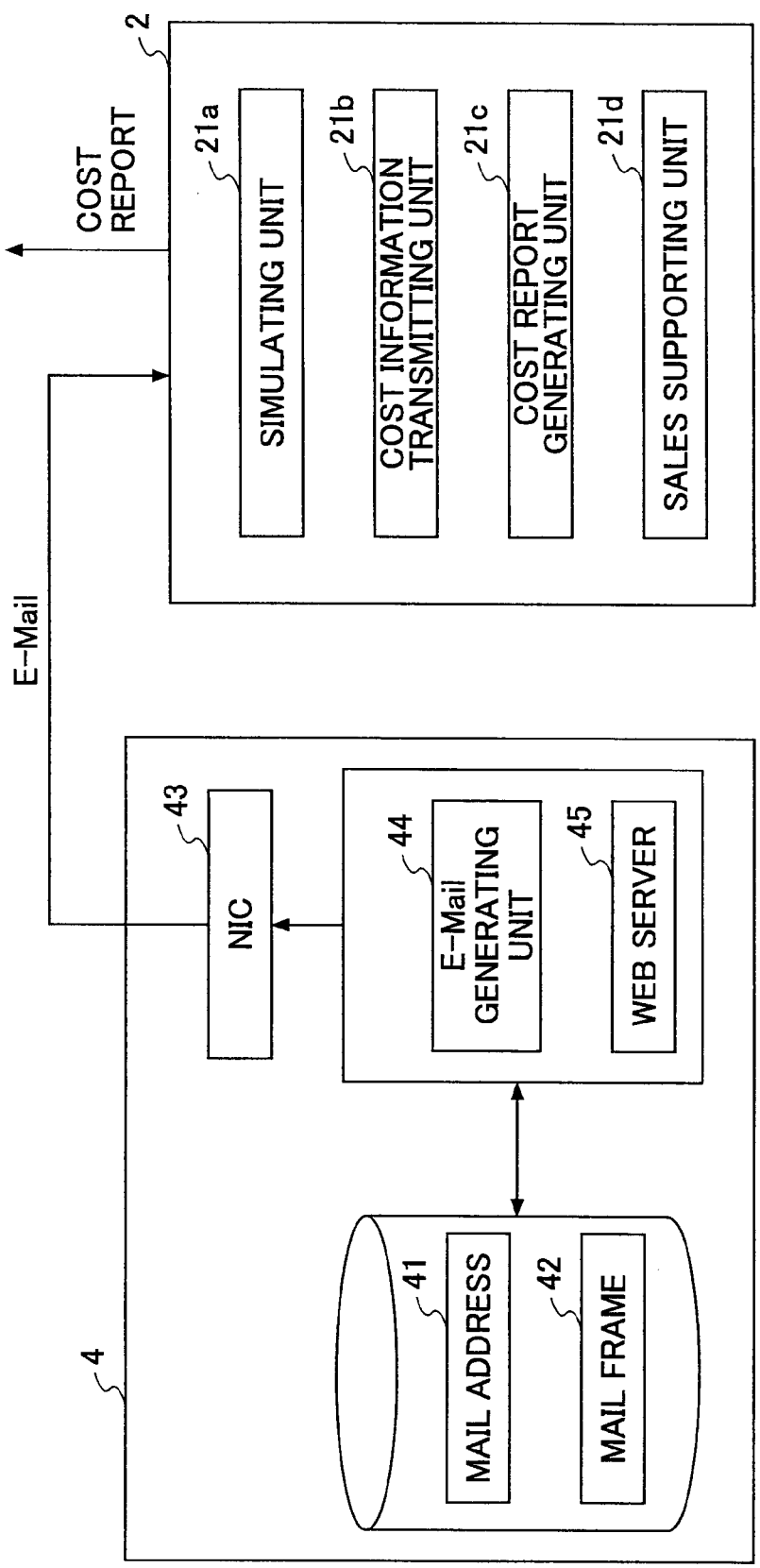
FIG. 9 is an exemplary functional block diagram of an LC printer and the cost server according to one embodiment of the present invention.

FIG. 9 is an exemplary functional block diagram of the LC printer 4 and the cost server 2. The LC printer 4 is controlled when a program stored in a storage unit such as ROM is executed by the CPU of the LC printer 4. The LC printer 4 includes a mail address 41 of the sending address to which the printer information is transmitted, a mail frame 42 used when the printer information is transmitted, a NIC 43 for connecting to the network 3, an e-mail generating unit 44, and a Web server 45, the functions of the e-mail generating unit 44 and the Web server 45 being realized when the CPU executes the relevant program. The cost server 2 includes a cost report generating unit 21c generating a cost report based on the printer information received by e-mail.

Next, the LC printer 4 is further described. The LC printer 4 is a printer capable of performing the monochrome printing and the full-color printing as well as the LC color printing. A user can perform any one of the printings by selecting the printing method.

The LC printer 4 can be connected to the network 3 via the NIC 43 and send E-Mil to a designated address. The protocol being used is, for example, SMTP which is widely used. When SMTP is used, a user previously sets SMTP server name, SMTP port number, mail address of the LC printer 4, mail address of the administrator, and mail address of transmission destination.

The e-mail generating unit 44 periodically or based on a user's instruction receives the printer information updated whenever the LC printer 4 has performed printing and generates e-mail including the printer information.

FIG. 10 shows an example of the printer information transmitted by e-mail. The printer information includes e-mail Receiving Time including date and time, Machine body unique information including the serial number of the LC printer 4, the Number of printed pages for each printing, Accumulated ink consumption amount for each printing coverage, Number of printed pages for each coverage range, and Accumulated number of exchanged ink cartridge. The unit of the accumulated ink consumption amount is percent (%) and the accumulated ink consumption amount includes the accumulated coverage of each printing.

In addition to the items of the printer information, user information including user's division name would be useful especially for, for example, an administrator who is managing the printing cost of the entire company by carefully comparing the printing costs of divisions. Also the administrator may be able to provide a suggestion to the user based on the comparison result. Further, the printing information along with the user information may also be useful for the selling company. Because of such situations, the LC printer 4 includes the Web server 45 so a user can input user information to the LC printer 4 using the Web server 45.

To that end, for example, a user starts the Web browser installed in the user terminal 1 and then connects the user terminal 1 to the LC printer 4 using the IP address of the LC printer 4. When the Web server 45 of the LC printer 4 is connected to the user terminal 1, Hyper Text Markup Language (HTML) file or eXtensible Markup Language (XML) file of the setting menu format allowing the user to input user information is transmitted to the user terminal 1.

FIGS. 11A and 11B show examples of a setting menu of the user information displayed on the Web browser of the user terminal 1, the menu being generated after being translated from the received file. In the setting menu, there are entry fields available for the items such as User Name, Division, Address, ZIP-Postal Code, Country/Area, Model Name, Serial Number, Purchase Date, Account Group, Accessories, Default Printer, Number of sharing users, Installation, and Connection.

A user can input all or only necessary items in the setting menu. When the user information of the user of the LC printer 4 is previously given, the selling company may previously input the user information. The information of the setting items is transmitted to the cost server 2 along with the printer information by e-mail. For example, when the transmission of e-mail is arranged to be prevented unless the setting of necessary setting items is completed, the cost server 2 can acquire the user information minimally required along with the printer information.

In above description, the user information as shown in FIG. 11 is set in the Web server 45 of the LC printer 4 once. However, the user information may alternatively be directly transmitted to the cost server 2. In this case, the cost server 2 extracts the unique information (for example, the Model Name and Serial Number) in the user information transmitted to the cost server 2, associates the unique information with the printer information and stores the associated data into, for example, a storage device 23.

Next, the cost report is described. FIG. 12A shows an example of the cost report. As shown in FIG. 12A, the cost report may include User name, Type of business, Type of operation, Model name of the LC printer 4, Serial Number, Installation date, Cost report issuing date, Accumulated number of printings, Accumulated ink consumption amount, and Rate of cost reduction. Among these items, data of User name through Accumulated ink consumption Amount of the printer information may be obtained from the corresponding data of the printer information transmitted by e-mail.

The rate of cost reduction may refer to the rate of the cost reduction obtained when, for example, a user changes a printer from a printer that the user is currently using to the LC printer 4. To this end, first, the cost of ink consumption amount in the LC printer which is provided for demonstration purposes is calculated from the accumulated ink consumption amount included in the printer information. More specifically, cost of each of the printings is obtained by multiplying each ink consumption amount of the monochrome, LC color, and full-color printings by the unit cost of the corresponding ink.

As a matter of convenience, when calculating the printing cost of the printer currently in use, it is assumed that the same documents are printed. Further, in the case where the printer currently in use cannot perform the LC color printing, since it is assumed that the LC color printing can be used in place of the monochrome printing from the viewpoint of the cost, it can be regarded that the ink consumption amount of the LC color printing is substantially the same as that of the monochrome printing. Still further, the cost of the ink or the toner (hereinafter refer to as supply parts) is given and the typical number of printing sheets of each of the supply parts under typical coverage conditions is also given. Based on the above facts, the cost report generating unit 21c calculates the cost of each ink consumption amount and the rate of cost reduction obtained by the use of the LC printer 4 so that the obtained rate of cost reduction is included in the cost report.

On the other hand, when the LC printer 4 is used, there may be a request to ascertain whether the cost of the color printing is really less than that of the monochrome printing. From this point of view, preferably, the cost report includes the ink consumption amount and the printing cost when a color copy is printed in monochrome and the ink consumption amount and the printing cost when a color copy is printed in color so as to be compared with each other. To that end, the cost report generating unit 21c estimates the ink consumption amount when a color copy is printed in monochrome from the data of the ink consumption amount when a color copy is printed in color or conversely estimates the ink consumption amount when a color copy is printed in color from the data of ink consumption amount when a color copy is printed in monochrome. Then, the cost report generating unit 21c calculates the printing costs when the color copy is printed in monochrome and when the color copy is printed in color. A user can compare the printing costs and understand that the cost when the color copy is printed in color is substantially equal to or less than the cost when the color copy is printed in monochrome.

Further, since most users appreciate knowing the printing cost per sheet based on the unit of currency, the item of the printing cost per sheet is included in the cost report. The printing cost per sheet may be calculated by, for example, multiplying the each ink consumption amount of the monochrome, the LC color, and the full-color printings by the corresponding unit price and then dividing by the corresponding number of printed pages.

Figures 12B, 12C:
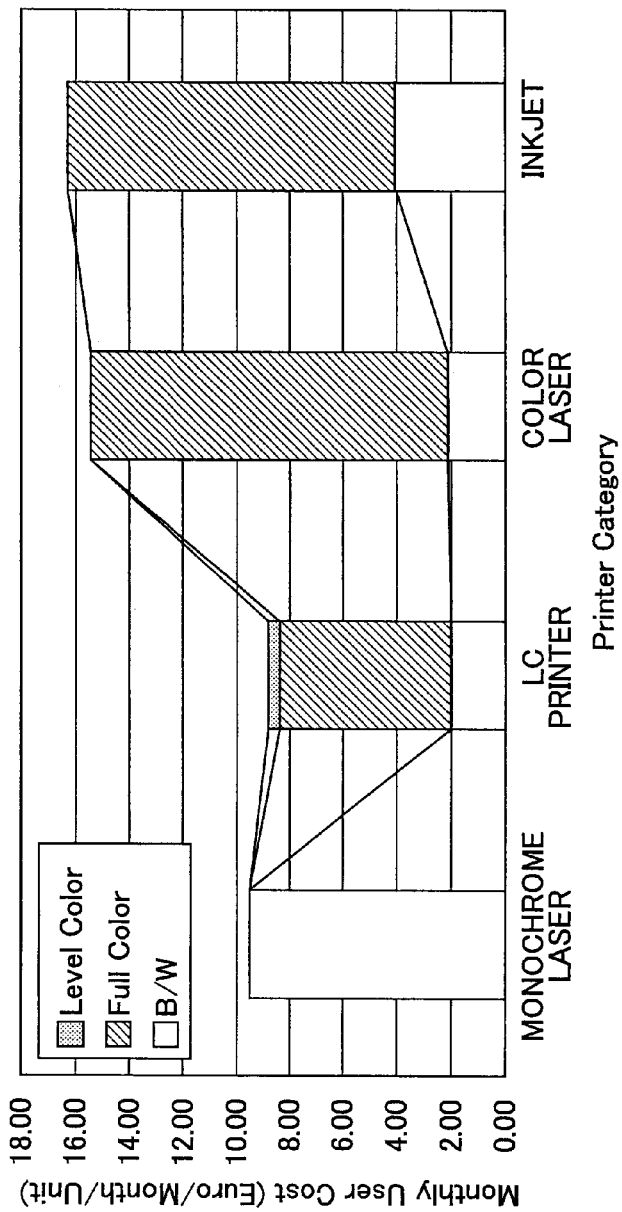

Still further, preferably, the cost report further includes a graph as shown in FIG. 12B. The graph of FIG. 12B shows the comparison among the costs per month of a monochrome laser printer, the LC printer 4, a color laser printer, and an inkjet printer based on the corresponding ink consumption amounts. As described above, the printer information of the LC printer 4 includes each cost of the monochrome, the LC color, and the full-color printings based on the corresponding ink consumption amount. These ink consumption amounts of the LC printer 4 are used to calculate the printing costs of the monochrome laser, the color laser, and the inkjet printers as shown in FIG. 12B. More specifically, for example, in a case of the monochrome laser printer, the monochrome laser printer cannot perform the LC color and the full-color printing. Therefore the monochrome laser printer prints with the monochrome printing using toner when printing the same copies that the LC printer 4 performs the LC color printing and full-color printing. Since the entire ink consumption amount in the LC color and the full-color printings used by the LC printer 4 is known, the cost of the toner used by the monochrome laser printer is obtained based on the cost of toner consumption amount that is necessary to print the same copies using the entire ink consumption amount in the LC color and the full-color printings of the LC printer 4. In the same manner, in a case of color laser and inkjet printers, neither the color laser nor the inkjet printers can perform the LC color printing. Therefore, the color laser and inkjet printers perform the full-color printing using inks when printing the same copies that the LC printer 4 prints with the LC color printing. Because of this feature, the costs of the monochrome printing of the color laser and inkjet printers are obtained based on the ink consumption amount of the monochrome printing of the LC printer 4, and the costs of the full-color printing is obtained based on the ink consumption amount of both the LC color printing and the full-color printing of the LC printer 4.

The graph of FIG. 12B explicitly confirms that the running cost of the LC color printing is less than that of the monochrome printing because ink consumption amount in LC color printing is relatively small.

FIG. 12C is a table showing a result of the cost change when the LC printer 4 is alternatively used. The table of FIG. 12C indicates that the cost of 10% of the entire pages printed by the LC printer 4 is reduced, 90% in the same range, and 0% increased. These percent values are obtained from the number of the printed pages in each the monochrome, the LC color, and the full-color printings by regarding the number of pages printed in the LC printing as the number of pages printed in the monochrome printing. The table may alternatively have each number of printed pages whose printing costs are reduced, substantially unchanged, and increased.

As a result, a user may understand from the cost report containing the costs calculated from the data of the user's printed sheets that the user can switch from the monochrome printing to the color printing with the LC color printer 4 when printing a color copy because the printing cost in the color printing with the LC color printer 4 is less than that in the monochrome printing.

Further, a user who purchases the LC printer 4 after being convinced by the demonstration will be able to continue to receive the cost reports periodically. The user may appreciate this feature because the user can obtain, for example, the rate of cost reduction indicating that the cost of the LC printer is less than that of the printer used before and can submit the cost report containing those data to, for example, the boss and the purchasing division of the same company.

Still advantageously, the general affairs division and the accounting division of the same company also can make use of the cost report. For example, since the cost report contains the number of printed pages in each the monochrome, the LC color, and the full-color printings, it becomes clear which division uses more full-color printing than any other division and which division less uses LC color printing than any other division. Additionally, if an LC printer 4 which prints much fewer pages than any other printer is found, the LC printer 4 can be moved to, for example, the division who prints more pages than any other division or removed to reduce waste and more effectively use the LC printer 4.

Next, advantages for the selling company are described. Herein, it is assumed that the selling company books the sales when the company sells both the LC printer 4 and consumables such as ink and paper. However, it should be noted that though the sale of the LC printer 4 is only once, the sales of the consumables are likely to continue and the more the number of printed pages, the more are the sales. In addition, the margin rate of the consumables is generally higher than that of the LC printer 4. Therefore, from the viewpoint of profit, it is preferable for the selling company to sell the LC printer 4 to the user or division who prints more pages than any other user or division.

Figure 13A:
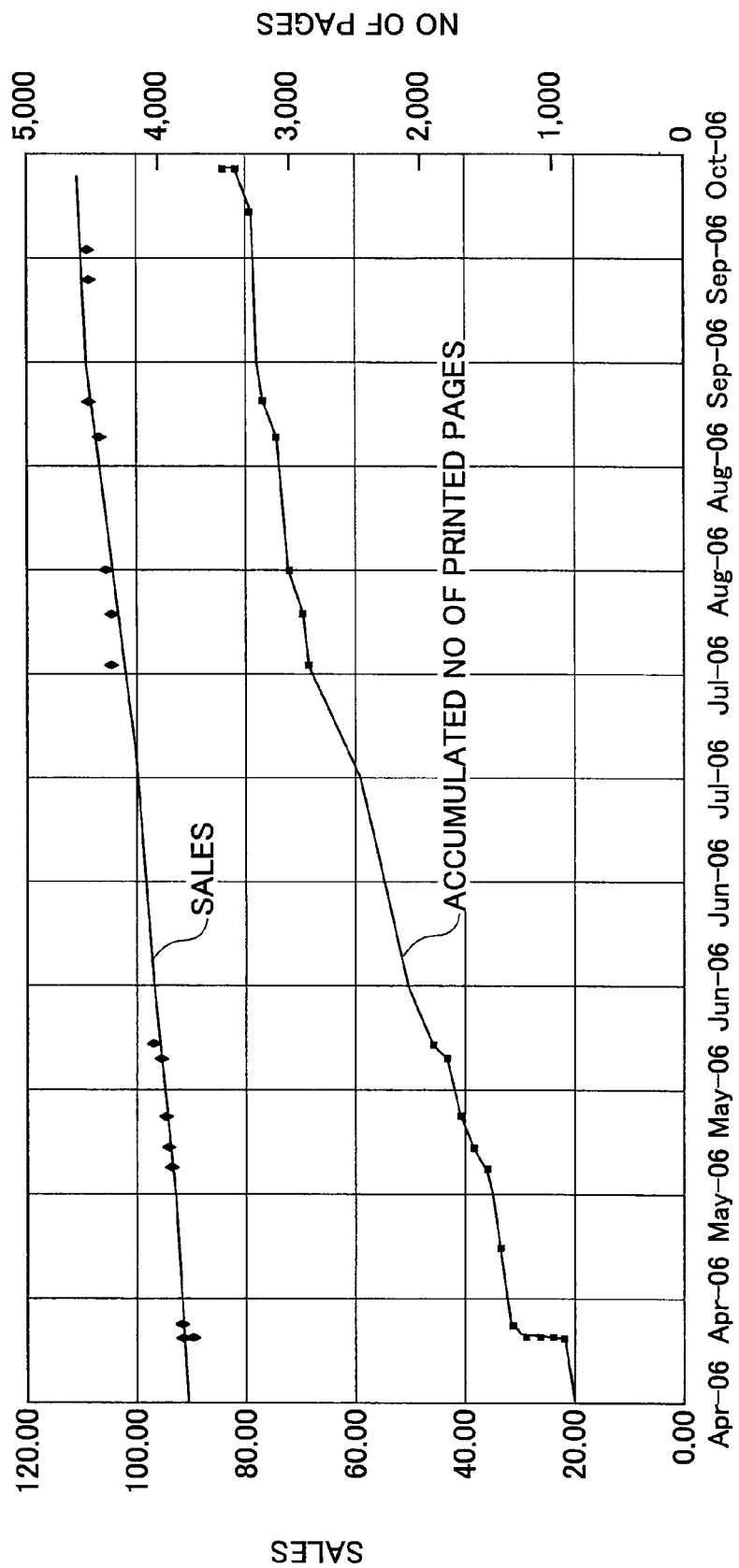
FIG. 13A is a graph showing an exemplary trend of accumulated printed pages and accumulated sales of an LC printer after the sale of the LC printer.

FIG. 13A shows the trends of the sales and the accumulated number of printed pages after the sale of the LC printer 4. As shown in FIG. 13A, after the sale of the LC printer 4 in April, the sales are increased as the accumulated number of the printed pages increases. Since the accumulated number of the printed pages increases at a substantially constant rate, future sales may be predicted by, for example, a straight-line approximation based on the trends in six months of the graph data. Therefore, the selling company can create a marketing strategy based on the graph created by a sales supporting unit 21*d* as shown in FIG. 13A and the gradient of the approximated straight line.

Additionally, since the printer information can be received from all users of the LC printer 4 and includes the type of user's business and the type of user's operation, the selling company can create a marketing strategy, for example, to make more effort to sell the LC printer 4 to the users having the type of business where more printers are being sold than any other type of business.

Figure 13B:
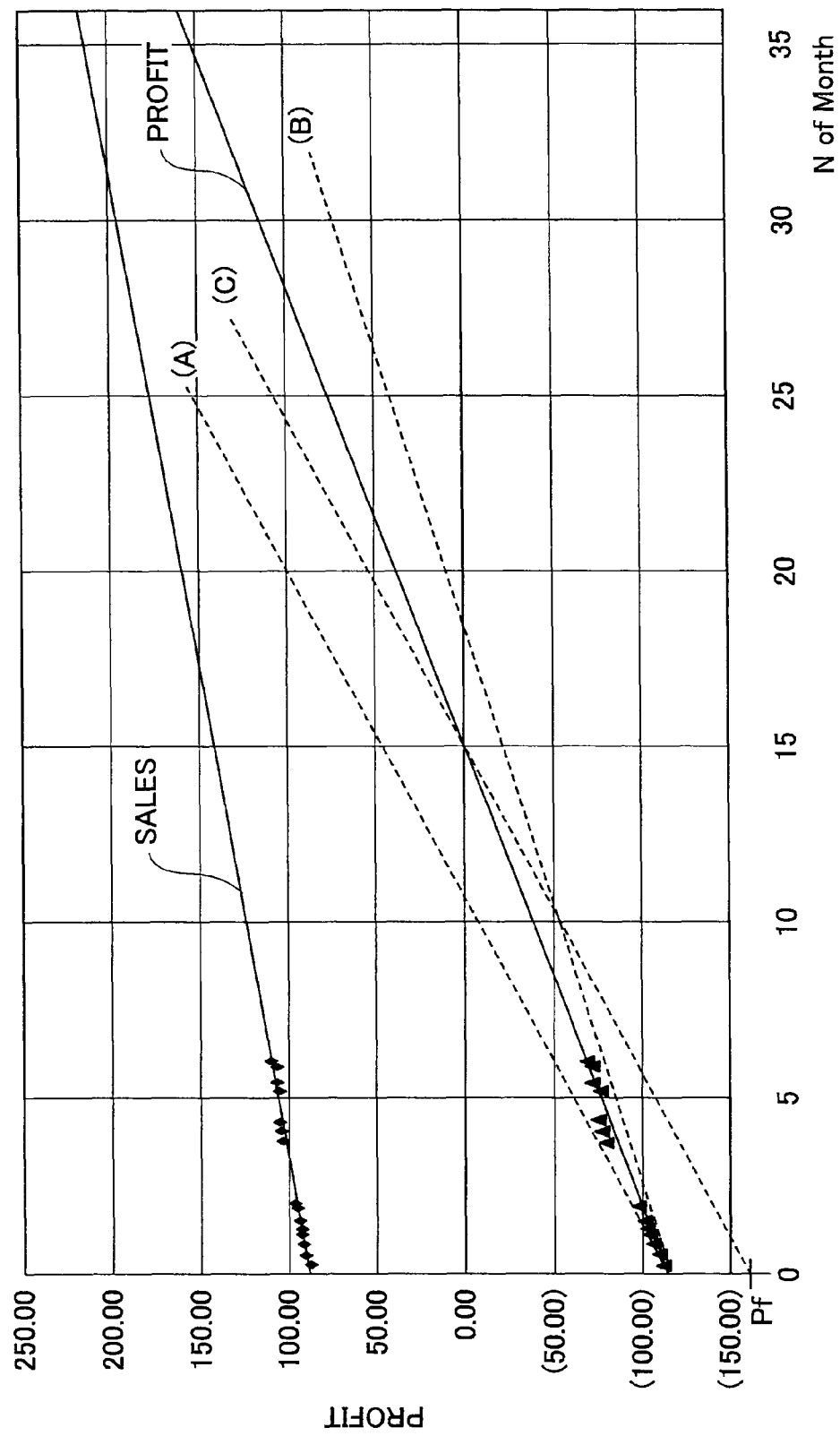
FIG. 13B is a graph showing an exemplary trend of accumulated sales and accumulated profit of the LC printer after the sale of the LC printer.

FIG. 13B shows the trends of sales and profit after the sale of the LC printer 4. The trend of sales in FIG. 13B is the same data as those in FIG. 13A except that the display period in FIG. 13B is 36 months, longer than that of FIG. 13A. Further, the trends of sales in FIG. 13B is obtained by extending the line obtained by the straight line approximation method using the six-month data of the trend of sales in FIG. 13A.

As for the profit in FIG. 13B, the initial value at the left-end vertical line is obtained by subtracting the cost of the LC printer 4 from the selling price of the LC printer 4. The profit in FIG. 13B is obtained by accumulating the profit calculated based on the accumulated ink consumption amount. As shown in FIG. 13B, though the profit increases as the accumulated number of printed pages increases, the profit is a minus value until about 15 months after the sale of the LC printer 4. This is because of the deficit sustained when the LC printer 4 is sold.

However, based on the above data, the selling company can predict when the deficit will be erased and the company will start making a profit and how much profit can be earned in the average service life (for example, 36 months) of the LC printer 4 based on the six months of data from the sale of the LC printer 4. In addition, based on the above data showing the profitability, the selling company may strategically determine the selling prices of the LC printer 4 and the consumables.

Further, the longer the demonstration period of the LC printer 4 at the user's site is, the more accurate the profit may be calculated by using the sales supporting unit 21*d* based on the accumulated ink consumption amount obtained in the printer information of the LC printer 4. As a result of the calculation by the sales supporting unit 21*d*, the gradient of the trend of the profit is obtained. As shown in FIG. 13B, when the gradient is steep or gentle, the accumulated profit moves from deficit to surplus earlier or later as shown in line A or B, respectively, in FIG. 13B. Preferably, the month when the accumulated profit moves from deficit to surplus calculated by the sales supporting unit 21*d* is displayed like "10 months later" or "20 months later" (not shown) somewhere on the graph in FIG. 13B.

Still further, the selling company may determine the selling price of the LC printer 4 so that the accumulated profit moves from deficit to surplus in a prescribed month, for example 15 months, after the sale of the LC printer 4. In this case, as shown in FIG. 13B, the line A is shifted at the same gradient to the position of line C so that the line C crosses from the deficit to surplus 15 months after the sale of the LC printer 4. The cross point of the line C and the left end vertical line shows the profit (Pf) on the sale of the LC printer 4. Therefore, the selling price (cost of the LC printer 4+Pf) can be determined. By using this feature, the selling company may sell the LC printer 4 so that the accumulated profit of the LC printer 4 moves from deficit to surplus in a prescribed period (in this case, 15 months) after the sale of the LC printer 4 by referring to the selling prices calculated by the sales supporting unit 21*d*.

Figure 14:
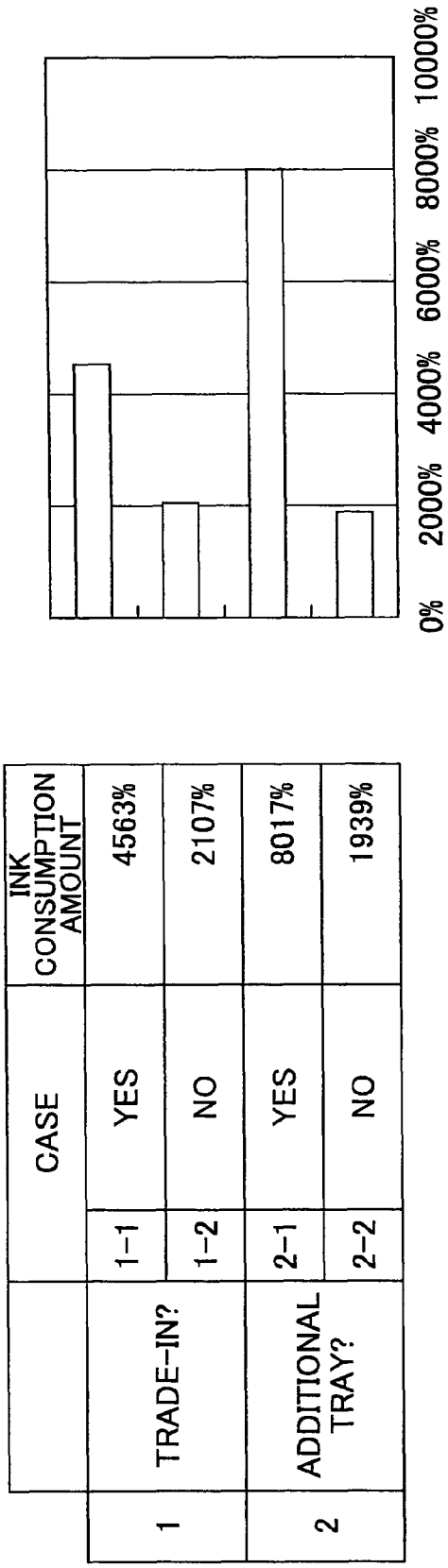
FIG. 14 is a diagram showing a comparison of ink consumption amounts of the cases whether there is trade-in when the LC printer is sold and whether the LC printer includes an additional tray.

As another feature of the sales supporting unit 21*d*, FIG. 14 shows a comparison of ink consumption amount calculated in several cases by the sales supporting unit 21*d*. According to FIG. 14, when there is a trade-in on the sale of the LC printer 4, the value of the ink consumption amount of the LC printer 4 is 4, 563%, and when there is no trade-in, the value is 2, 107%. The values from the top to the bottom in FIG. 14 are obtained from the averaged values of the LC printers with a trade-in, without a trade-in, with additional trays, and without additional trays, respectively. Based on the data calculated by the sales supporting unit 21*d* as shown in FIG. 14, the selling company may study, for example, the case where the ink consumption amount is higher than any other case and decide on an effective sales plan.

As still another feature of the sales supporting unit 21*d*, the sales supporting unit 21*d* ranks, for example, the ink consumption amount in decreasing order using the type of business or division as a key. Therefore when there is a division having a larger ink consumption amount, the selling company may study the reason of the larger ink consumption amount based on, for example, the printer information from the printers of the division and decide on an effective sales plan.

As described above, the appropriate printer selection simulation system 10 according to an embodiment of the present invention enables a user to recognize that the cost of the LC color printing is less than that of the monochrome printing and to select an appropriate printer performing expressive printing at lower cost. Further, since the user is informed of the actual printing cost of the LC printer 4 with the cost report, the user may understand the effect of the cost reduction to be realized by using the LC printer 4, from the data in the cost report. Still further, based on the cost report, the user may relocate the LC printer 4 and provide a suggestion on the printing to each division of the same company. Still further, the selling company selling the LC printer 4 may make use of the printer information and decide on a more effective plan to sell the LC printer 4. The more printer information the selling company receives (The more units the LC printers 4 are sold), the more effectively the selling company sells the LC printers 4.

The present invention is not limited to the above-mentioned embodiments, and variations and modifications may be made without departing from the scope of the present invention.

It should be noted that the following variations/modifications are obviously included the embodiments of the present invention and within the scope of the present invention:

An ink consumption amount simulation program including any one of a print file generating unit generating a print file that is translated and printed by a printer and a receiving unit receiving the print file; and a simulating unit calculating an ink consumption amount used when the print file is printed on a sheet; and A report generating program including a receiving unit receiving printer information from a printer via a network by e-mail, the printer information including ink consumption of the printer, a cost report generating unit generating a cost report indicating that the cost when a color copy is printed in color is less than the cost when the color copy is printed in monochrome based on the received ink consumption amount, and a transmitting unit transmitting the generated cost report to a user terminal connected to the network.

What is claimed is:

1. An ink consumption amount simulation device comprising:
   any one of a print file generating unit generating a print file that is to be translated and printed by a printer and a receiving unit receiving the print file; and
   a simulating unit calculating an ink consumption amount used when the print file is printed on a sheet, and the simulating unit calculates a first ink consumption amount when a first print file is printed on a sheet, the first print file being used when a color copy is printed in color, and a second ink consumption amount when a second print file is printed on a sheet, the second print file being used when the color copy is printed in monochrome, and outputs the calculated result indicating that the first ink consumption amount is less than the second ink consumption amount.

2. A cost server comprising:
   a receiving unit receiving printer information from a printer via a network by e-mail, the printer information including an amount of ink consumption of the printer;
   a cost report generating unit generating a cost report indicating that the cost when a color copy is printed in color is less than the cost when the color copy is printed in monochrome based on the received ink consumption amount; and
   a transmitting unit transmitting the generated cost report to a user terminal connected to the network.

3. The cost server according to claim 2, wherein
   the ink consumption amount when the color copy is printed in monochrome is a toner consumption amount of a laser printer estimated from the ink consumption amount of the printer; and
   the ink consumption amount when the color copy is printed in color is the ink consumption amount of the printer.

4. The cost server according to claim 2, wherein
   the ink consumption amount when the color copy is printed in monochrome is the ink consumption amount of the printer estimated from the ink consumption amount when color printing is performed by the printer; and
   the ink consumption amount when the color copy is printed in color is the ink consumption amount of the printer, or wherein:
   the ink consumption amount when the color copy is printed in monochrome is the ink consumption amount of the printer when monochrome printing is performed by the printer; and
   the ink consumption amount when the color copy is printed in color is the ink consumption amount of the printer estimated from the ink consumption amount when monochrome printing is performed by the printer.

5. The cost server according to claim 2, wherein
   the cost report includes the number of printed pages or ink consumption amount of both the color and the monochrome printings in a prescribed period.

6. The cost server according to claim 2, wherein
   the server further comprises a sales supporting unit calculating profit earned by selecting and using the printer based on the ink consumption amount and trend of the profit and predicting future profit based on the calculated trend of the profit.

* * * * *